(12) United States Patent
Otake et al.

(10) Patent No.: US 8,749,914 B2
(45) Date of Patent: Jun. 10, 2014

(54) DISK-ENCLOSURE BASE CONFIGURED TO INHIBIT FORMATION OF ADHERENT SOLDER-FLUX RESIDUE

(75) Inventors: Noritaka Otake, Kanagawa (JP);
Takako Hayakawa, Kanagawa (JP);
Kazuhide Ichikawa, Kanagawa (JP);
Teruhiro Nakamiya, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 334 days.

(21) Appl. No.: 13/228,363

(22) Filed: Sep. 8, 2011

(65) Prior Publication Data

US 2013/0063838 A1 Mar. 14, 2013

(51) Int. Cl.
*G11B 5/127* (2006.01)

(52) U.S. Cl.
USPC .................. 360/97.12; 360/99.24; 360/99.25

(58) Field of Classification Search
USPC ................................ 360/97.12, 99.24–99.25
See application file for complete search history.

(56) References Cited

U.S. PATENT DOCUMENTS

| | | | |
|---|---|---|---|
| 7,123,440 B2 | 10/2006 | Albrecht et al. | |
| 7,872,836 B2 | 1/2011 | Shindo et al. | |
| 7,876,527 B2 | 1/2011 | Nakamiya et al. | |
| 2005/0068666 A1 | 3/2005 | Albrecht et al. | |
| 2006/0138886 A1* | 6/2006 | Ito et al. | 310/89 |
| 2007/0284412 A1 | 12/2007 | Prakash et al. | |
| 2008/0259503 A1 | 10/2008 | Aoyagi et al. | |
| 2009/0097163 A1 | 4/2009 | Suzuki et al. | |
| 2009/0168233 A1 | 7/2009 | Kouno et al. | |
| 2010/0328815 A1 | 12/2010 | Nakatsuka et al. | |
| 2012/0182645 A1* | 7/2012 | Kurokawa et al. | 360/99.08 |

OTHER PUBLICATIONS

Adam Technologies, "Disk Drive Connectors", http://www.adam-tech.com/pg299-301.pdf, 299-301, 2009.
FCI, "Disk Drive Interface Connectors", http://portal.fciconnect.com/res/en/pdffiles/950504-007_Disk_Drive_Interface_Connectors.pdf, May 11, 2005.

* cited by examiner

*Primary Examiner* — Wayne Young
*Assistant Examiner* — Carlos E Garcia

(57) ABSTRACT

A disk-enclosure base that is configured to inhibit formation of adherent solder-flux residue. The disk-enclosure base includes a casting, a through-hole fabricated in the casting, a solder channel, an E-coat layer, and an E-coat-free zone. The E-coat layer is applied to a first portion of an interior surface of the casting. The E-coat-free zone is adjacent to and surrounds the solder channel. The E-coat-free zone also includes a second portion of the interior surface of the casting lying between the solder channel and the E-coated first portion of the interior surface of the casting. The E-coat-free zone is configured to inhibit formation of adherent solder-flux residue. A disk-enclosure-base/electrical-feedthrough assembly that is configured to inhibit formation of adherent solder-flux residue, and a hard-disk drive (HDD) including the disk-enclosure-base/electrical-feedthrough assembly are also provided.

20 Claims, 7 Drawing Sheets

DISK-ENCLOSURE BASE CONFIGURED TO INHIBIT FORMATION OF ADHERENT SOLDER-FLUX RESIDUE

TECHNICAL FIELD

Embodiments of the present invention relate generally to the field of hard-disk drives (HDDs), and in particular to disk enclosures for HDDs.

BACKGROUND

The demands of the marketplace for high reliability and low cost HDDs continues unabated with the advance in HDD technology. A factor effecting reliability is the cleanliness of the internal environment of the HDD, because of the role that adventitious debris generated in the manufacturing process plays in maintaining access to information stored at high areal density (AD). In particular, any debris resulting from the manufacturing process, if left uncontrolled in the internal environment provided by the disk enclosure of the HDD, can have deleterious effects on fly-height of the magnetic-recording head leading to increased soft and hard error rates in the reading of information stored on the magnetic-recording disk. Thus, engineers and scientists engaged in the development of HDDs are becoming increasingly more interested in developing methods for reducing sources of adventitious debris generated in the manufacturing process of the HDD to reduce manufacturing costs, and increase the manufacturing yields of high-reliability HDDs.

SUMMARY

Embodiments of the present invention include a disk-enclosure base that is configured to inhibit formation of adherent solder-flux residue. The disk-enclosure base includes a casting, a through-hole fabricated in the casting, a solder channel, an E-coat layer, and an E-coat-free zone. The E-coat layer is applied to a first portion of an interior surface of the casting. The E-coat-free zone is adjacent to and surrounds the solder channel. The E-coat-free zone also includes a second portion of the interior surface of the casting lying between the solder channel and the E-coated first portion of the interior surface of the casting. The E-coat-free zone is configured to inhibit formation of adherent solder-flux residue. Embodiments of the present invention also include a disk-enclosure-base/electrical-feedthrough assembly that is configured to inhibit formation of adherent solder-flux residue, and a hard-disk drive (HDD) including the disk-enclosure-base/electrical-feedthrough assembly.

DESCRIPTION OF THE DRAWINGS

The accompanying drawings, which are incorporated in and form a part of this specification, illustrate embodiments of the invention and, together with the description, serve to explain the embodiments of the invention.

Figure 1:
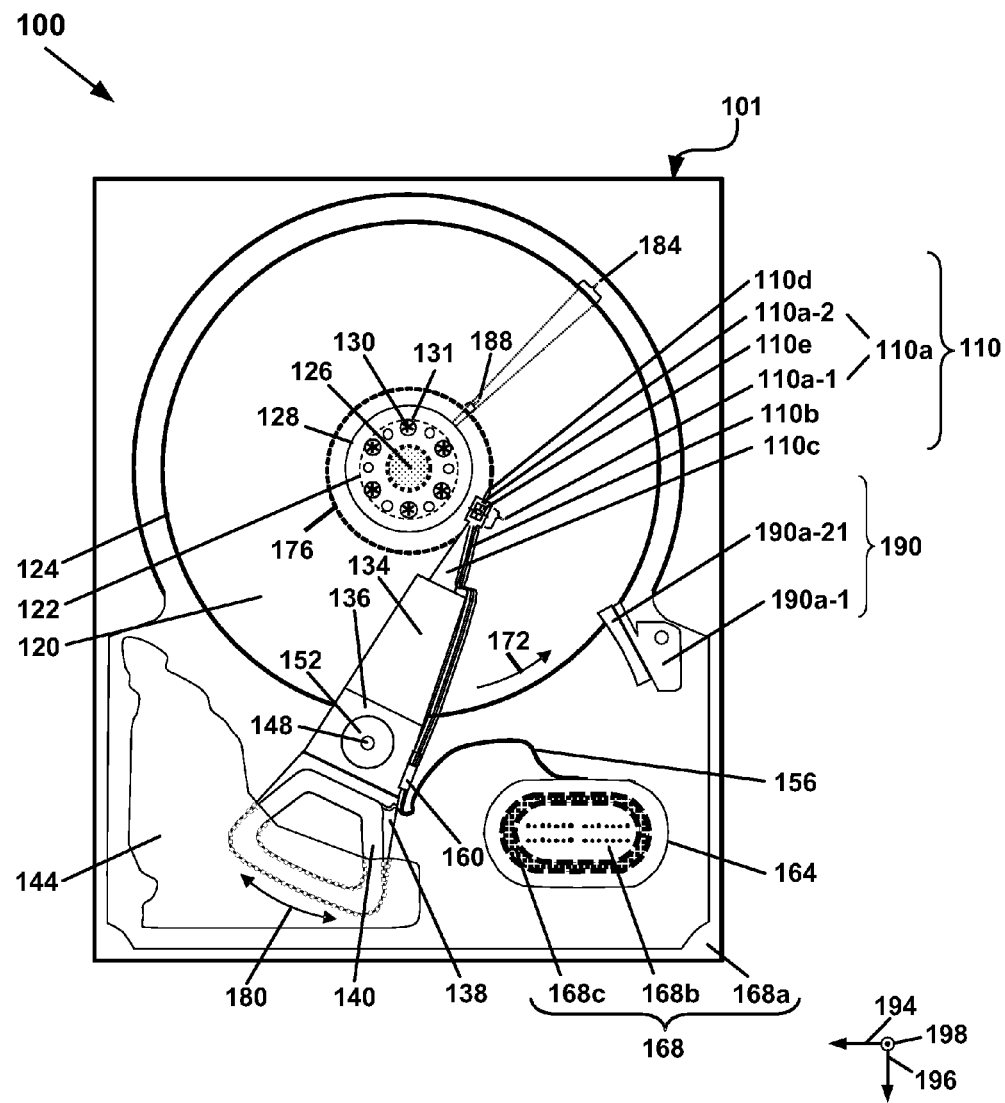
FIG. 1 is a plan view illustrating the arrangement of components within an example environment of a hard-disk drive (HDD) that includes a disk-enclosure-base/electrical-feedthrough assembly configured to inhibit formation of adherent solder-flux residue, in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Figure 2A:
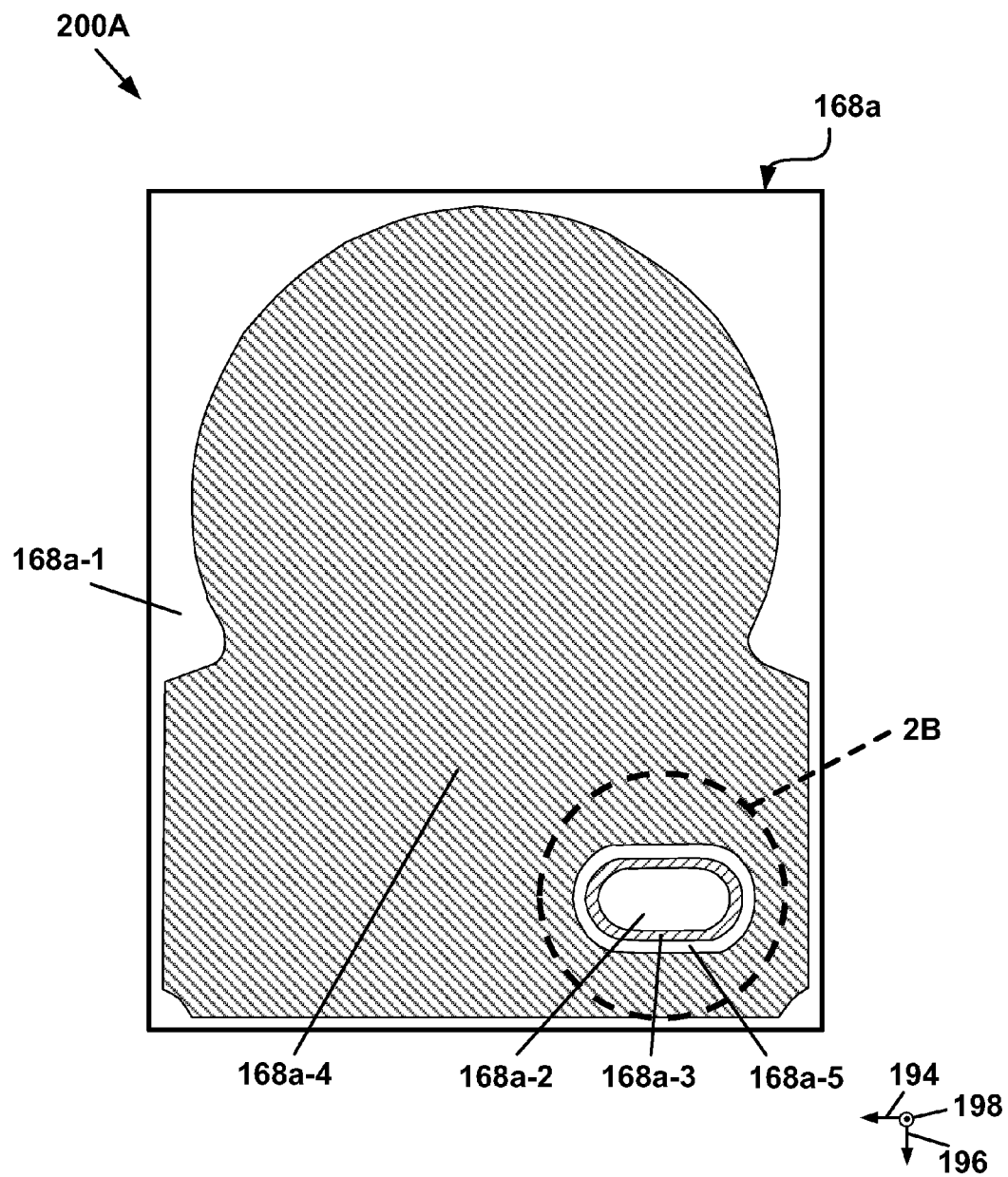
FIG. 2A is a plan view of a disk-enclosure base that is configured to inhibit formation of adherent solder-flux residue of the HDD of FIG. 1, detailing the arrangement of components of the disk-enclosure base, in accordance with one or more embodiments of the present invention.

Physical Description of Embodiments of a Disk-Enclosure Base Configured to Inhibit Formation of Adherent Solder-Flux Residue With reference now to FIG. 1 and FIG. 2A, in accordance with embodiments of the present invention, a plan view 100 of a hard-disk drive (HDD) 101 is shown in FIG. 1; and, a plan view 200A of a disk-enclosure base 168a is shown in FIG. 2A. Embodiments of the present invention produce a solder joint 168c which has high structural reliability. Embodiments of the present invention also protect against the effects of solder-flux splattered in the course of a soldering operation to join an electrical feedthrough 168b to a disk-enclosure base 168a of HDD 101. In the absence of embodiments of the present invention, solder-flux can splatter due to the presence of bubbles inside of the solder to form an adherent solid solder-flux residue. As the soldering operation can produce a large number of bubbles, the bubbles can burst and splatter the solder flux in the area around the solder joint 168c. The E-coat layer 168a-4 (see FIG. 2A), which acts as a protective screen for the interior space of HDD 101, covers a first portion of the interior surface of the disk-enclosure base 168a. However, in the absence of embodiments of the present invention, the solder flux can react with an E-coat layer and undergo chemical alteration at the high temperatures of the soldering operation that can result in the formation the adherent solid solder-flux residue. Moreover, the solder-flux residue may include a powerful reducing agent containing halogens. Thus, embodiments of the present invention suppress the formation of solder-flux residue with the E-coat layer 168a-4 (see FIG. 2A) in order to achieve a halogen-free environment and to protect the functionality of HDD 101. Thus, in accordance with embodiments of the present invention, a structure, by way of example, an E-coat-free zone 168a-5 (see FIG. 2A), without limitation thereto, is provided for preventing the production of adherent solid solder-flux residue.

In subsequent description of HDD 101, embodiments of the present invention incorporate within the environment of HDD 101, without limitation thereto, the subsequently described embodiments of the present invention for the disk-enclosure base 168a, as shown in FIGS. 1-4B, without limitation thereto, that is configured to inhibit formation of adherent solder-flux residue, and the disk-enclosure-base/electrical-feedthrough assembly 168, as shown in FIGS. 1 and 3A-4B, without limitation thereto, that is also configured to inhibit formation of adherent solder-flux residue.

With further reference to FIG. 1, in accordance with one or more embodiments of the present invention, the arrangement of components within HDD 101 is illustrated. In accordance with one or more embodiments of the present invention, HDD 101 includes the disk-enclosure-base/electrical-feedthrough assembly 168 that is configured to inhibit formation of adherent solder-flux residue. In accordance with one or more embodiments of the present invention, the disk-enclosure-base/electrical-feedthrough assembly 168 includes the disk-enclosure base 168a, an electrical feedthrough 168b, and a solder joint 168c. In accordance with one or more embodiments of the present invention, the disk-enclosure base 168a is configured to inhibit formation of adherent solder-flux residue resulting from a soldering operation of the electrical feedthrough 168b to the disk-enclosure base 168a with the formation of solder joint 168c, as subsequently described in greater detail in the discussion of FIGS. 2A-4B.

With further reference to FIG. 1, in accordance with one or more embodiments of the present invention, HDD 101 also includes at least one HGA 110. The HGA 110 includes a gimbal 110e, and a head-slider 110a. The head-slider 110a includes a slider 110a-1, and a magnetic-recording head 110a-2 coupled with the slider 110a-1. The HGA 110 further includes a lead-suspension 110b attached to the head-slider 110a, and a load beam 110c attached to the head-slider 110a, which includes the magnetic-recording head 110a-2 at a distal end of the head-slider 110a. The head-slider 110a is attached at the distal end of the load beam 110c to the gimbal 110e, which is attached to the load beam 110c. HDD 101 also includes at least one magnetic-recording disk 120 rotatably mounted on a spindle 126 and a spindle motor (not shown) mounted in the disk-enclosure-base/electrical-feedthrough assembly 168 and attached to the spindle 126 for rotating the magnetic-recording disk 120. The HGA 110 also includes a tongue 110d, which is used in loading and unloading the head-slider 110a from the magnetic-recording disk 120, using a load-unload ramp structure 190 including a load-unload ramp 190a-21 and bracket 190a-1. The magnetic-recording disk has an inside-diameter edge 122, and an outside-diameter edge 124, which are often informally referred to as the inside-diameter and the outside diameter, it being understood that these terms of art refer to the corresponding portion of the magnetic-recording disk 120. The magnetic-recording head 110a-2 that includes a write element, a so-called writer, and a read element, a so-called reader, is disposed for respectively writing and reading information, referred to by the term of art, "data," stored on the magnetic-recording disk 120 of HDD 101. The magnetic-recording disk 120, or a plurality (not shown) of magnetic-recording disks, are affixed to the spindle 126 with a disk clamp 128. The disk clamp 128 is provided with fastener holes, for example, fastener hole 130, and serves to clamp the magnetic-recording disk 120, or magnetic recording disks (not shown), to a hub (not shown) with fasteners, of which fastener 131 is an example. HDD 101 further includes an actuator arm 134 attached to HGA 110, a carriage 136, a voice-coil motor (VCM) that includes an armature 138 including a voice coil 140 attached to the carriage 136; and a stator 144 including a voice-coil magnet (not shown); the armature 138 of the VCM is attached to the carriage 136 and is configured to move the actuator arm 134 and HGA 110 to access portions of the magnetic-recording disk 120, as the carriage 136 is mounted on a pivot-shaft 148 with an interposed pivot-bearing assembly 152.

With further reference to FIG. 1, in accordance with one or more embodiments of the present invention, electrical signals, for example, current to the voice coil 140 of the VCM, write signals to and read signals from the magnetic-recording head 110a-2, are provided by a flexible cable 156. Interconnection between the flexible cable 156 and the magnetic-recording head 110a-2 may be provided by an arm-electronics (AE) module 160, which may have an on-board preamplifier for the read signal, as well as other read-channel and write-channel electronic components. The flexible cable 156 is coupled to an electrical-connector block 164, which provides electrical communication through electrical feedthrough 168b as part of the disk-enclosure-base/electrical-feedthrough assembly 168. The disk-enclosure-base/electrical-feedthrough assembly 168 also includes the disk-enclosure base 168a, which may include a casting 168a-1, depending upon whether the disk-enclosure base 168a is cast. The disk-enclosure-base/electrical-feedthrough assembly 168 in conjunction with an HDD cover (not shown) provides a sealed protective disk enclosure for the information storage components of HDD 101. The disk-enclosure-base/electrical-feedthrough assembly 168 also includes the solder joint 168c that joins the electrical feedthrough 168b to the disk-enclosure base 168a. In accordance with embodiments of the present invention, the disk-enclosure-base/electrical-feedthrough assembly 168 of HDD 101 is substantially free of corrosive solder-flux residue that might be left after formation of the solder joint 168c. As used herein the term of art, "substantially free," used with respect to solder flux residue that might be left in the sealed disk enclosure, after cleaning the disk-enclosure-base/electrical-feedthrough assembly 168 to remove solder flux residue, means that the solder flux residue, if any, that remains is below a level that might cause reliability problems within the interior space of HDD 101, for example, by serving as a factor in the generation of corrosion products, or debris, within interior space of HDD 101. In accordance with one or more embodiments of the present invention, the solder joint 168c is configured to seal hermitically the electrical feedthrough 168b to the disk-enclosure base 168a. Both electrical feedthrough 168b and solder joint 168c are highlighted with dashed lines to indicate that both electrical feedthrough 168b and solder joint 168c are disposed underneath the electrical-connector block 164, in the plan view 100 as shown in FIG. 1. Thus, in accordance with one or more embodiments of the present invention, a clean, hermetically sealed interior space is created by the disk enclosure for components of HDD 101 enclosed by the disk enclosure. Moreover, the electrical feedthrough 168b provides a means of electrical communication between components of HDD 101 hermetically sealed within the interior space created by the disk enclosure and components of HDD 101 outside of the interior space of HDD 101.

With further reference to FIG. 1, in accordance with one or more embodiments of the present invention, HDD 101 further includes a low-density gas that fills the interior space of HDD 101 formed by the disk enclosure. In accordance with one embodiment of the present invention, the low-density gas includes helium. In accordance with another embodiment of the present invention, the solder joint 168c between the electrical feedthrough 168b and the disk-enclosure base 168a is configured to be impervious to leakage of the low-density gas out from the interior space of HDD 101 through the solder joint 168c. Thus, in accordance with another embodiment of the present invention, the solder joint 168c is substantially free of cracks that could result in leakage of the low-density gas out from the interior space of HDD 101 through the solder joint 168c.

With further reference to FIG. 1, in accordance with one or more embodiments of the present invention, other electronic components (not shown), including a disk controller and servo electronics including a digital-signal processor (DSP), provide electrical signals to the spindle motor, the voice coil 140 of the VCM, and the magnetic-recording head 110a-2 of HGA 110. The electrical signal provided to the spindle motor enables the spindle motor to spin providing a torque to the spindle 126 which is in turn transmitted to the magnetic-recording disk 120 that is affixed to the spindle 126 by the disk clamp 128; as a result, the magnetic-recording disk 120 spins in direction 172. The spinning magnetic-recording disk 120 creates an airflow including an air-stream, and a self-acting air bearing on which the air-bearing surface (ABS) of the head-slider 110a rides so that the head-slider 110a flies in proximity with the recording surface of the magnetic-recording disk 120 to avoid contact with a thin magnetic-recording medium of the magnetic-recording disk 120 in which information is recorded. The electrical signal provided to the voice coil 140 of the VCM enables the magnetic-recording head 110a-2 of HGA 110 to access a track 176 on which information is recorded. As used herein, "access" is a term of art that refers to operations in seeking the track 176 of the magnetic-recording disk 120 and positioning the magnetic-recording head 110a-2 on the track 176 for both reading data from, and writing data to, the magnetic-recording disk 120. The armature 138 of the VCM swings through an arc 180 which enables HGA 110 attached to the armature 138 by the actuator arm 134 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the magnetic-recording head 110a-2 of HGA 110 reads the servo-burst-signal pattern which provides a position-error-signal (PES) to the servo electronics, which controls the electrical signal provided to the voice coil 140 of the VCM, enabling the magnetic-recording head 110a-2 to follow the track 176. Upon finding the track 176 and identifying a particular sectored track portion 188, the magnetic-recording head 110a-2 either reads data from the track 176, or writes data to, the track 176 depending on instructions received by the disk controller from an external agent, for example, a microprocessor of a computer system.

As shown in FIG. 1, the direction of arrow 196 is about parallel to the long side of the disk-enclosure-base/electrical-feedthrough assembly 168 of HDD 101; the direction of arrow 194 is perpendicular to arrow 196 and is about parallel to the short side of the disk-enclosure-base/electrical-feedthrough assembly 168 of HDD 101; and, arrow 198, which is indicated by the arrow head of arrow 198, is about perpendicular to the plane of the disk-enclosure-base/electrical-feedthrough assembly 168, as well as the plane of the recording surface of the magnetic recording disk 120, and therefore is perpendicular to arrows 194 and 196. Thus, the triad of arrows 194, 196 and 198 are related to one another by the right-hand rule for vectors in the direction of the arrows 194, 196 and 198 such that the cross product of the vector corresponding to arrow 194 and the vector corresponding to arrow 196 produces a vector parallel and oriented in the direction of the arrow 198. The terms of art, "bottom" and "top," refer to structures and sides of structures that are oriented perpendicular to vector 198; "bottom" refers to sides facing the disk-enclosure-base/electrical-feedthrough assembly 168, or structures disposed below the center plane of HDD 101 that is parallel to the plane of the magnetic-recording disk 120; and "top", to sides facing the DE cover (not shown), or structures disposed above the center plane of HDD 101. The term of art, "upward" refers to entities aligned in the same direction and sense of the vector 198; and, the term of art, "downward" to entities aligned in the opposite direction and sense of the vector 198. The term of art, "vertical" refers to entities aligned parallel to the vector 198; and, the term of art, "horizontal" to entities aligned perpendicular to the vector 198. The triad of arrows 194, 196 and 198 is subsequently used to indicate the orientation of views for subsequently described drawings of the disk-enclosure base 168a in FIGS. 2A-4B. and the disk-enclosure-base/electrical-feedthrough assembly 168 in FIGS. 3A-4B with respect to FIG. 1.

As described above with reference to FIG. 1 and to subsequently described FIGS. 2A-4B, embodiments of the present invention encompass within their scope a HDD 101 that includes a magnetic-recording disk 120, a disk enclosure including a disk-enclosure cover (not shown), and a disk-enclosure-base/electrical-feedthrough assembly 168, a spindle motor affixed in the disk-enclosure-base/electrical-feedthrough assembly 168, for rotating the magnetic-recording disk 120, and a magnetic-recording head 110a-2. In accordance with one or more embodiments of the present invention, the magnetic-recording head 110a-2 includes a write element configured to write data to the magnetic-recording disk 120, and a read element configured to read data from the magnetic-recording disk 120. In accordance with one or more embodiments of the present invention, the disk-enclosure-base/electrical-feedthrough assembly 168 includes the disk-enclosure base 168a, the electrical feedthrough 168b, and the solder joint 168c. The disk-enclosure base 168a includes a casting 168a-1, a through-hole 168a-2 fabricated in the casting 168a-1 and in which the electrical feedthrough 168b is disposed, an E-coat layer 168a-4, and an E-coat-free zone 168a-5. The E-coat layer 168a-4 is applied to a first portion of an interior surface of the casting 168a-1. The E-coat-free zone 168a-5 surrounds the solder joint 168c. The E-coat-free zone 168a-5 also includes a second portion of the interior surface of the casting 168a-1 lying between the solder joint 168c and the E-coated first portion of the interior surface of the casting 168a-1. The solder joint 168c joins the electrical feedthrough 168b to the disk-enclosure base 168a, and is configured to seal hermetically the electrical feedthrough 168b to the disk-enclosure base 168a. The E-coat-free zone 168a-5 is configured to inhibit formation of adherent solder-flux residue.

With reference now to FIG. 2A and further reference to FIG. 1, in accordance with embodiments of the present invention, a plan view 200A of the disk-enclosure base 168a is shown. As shown in FIG. 2A, the triad of arrows 194, 196 and 198 indicates that the orientation of plan view 200A is the same as the orientation of plan view 100 of FIG. 1; and, similarly triads of arrows 194, 196 and 198 indicate that the orientations of the respective plan views 200B, 300A and 300B of FIGS. 2B-3B are the same as the orientation of plan view 100 of FIG. 1. FIG. 2A shows in detail the arrangement of components of the disk-enclosure base 168a configured to inhibit formation of adherent solder-flux residue in HDD 101 of FIG. 1. The disk-enclosure base 168a includes a casting 168a-1, a through-hole 168a-2 fabricated in the casting 168a-1, a solder channel 168a-3, an E-coat layer 168a-4, and an E-coat-free zone 168a-5. The solder channel 168a-3 is adjacent to and surrounds the through-hole 168a-2. The E-coat layer 168a-4 is applied to a first portion of an interior surface of the casting 168a-1. The E-coat-free zone 168a-5 is adjacent to and surrounds the solder channel 168a-3, and includes a second portion of the interior surface of the casting 168a-1 lying between the solder channel 168a-3 and the E-coated first portion of the interior surface of the casting 168a-1. The E-coat-free zone 168a-5 is configured to inhibit formation of adherent solder-flux residue, for example, during a soldering operation in which the electrical feedthrough 168b is joined to the disk-enclosure base 168a to fabricate the disk-enclosure-base/electrical-feedthrough assembly 168.

With further reference to FIGS. 1 and 2A, in accordance with embodiments of the present invention, the through-hole 168a-2 extends from an exterior surface of the casting 168a-1 to an interior surface of the casting 168a-1. The E-coat layer 168a-4 is applied on an interior surface of the casting 168a-1 that is configured to provide a surface of an interior wall of the disk enclosure of HDD 101. The solder channel 168a-3 may include a machined recess in the interior surface of the casting 168a-1, without limitation thereto, as the solder channel 168a-3 may also be molded into the casting 168a-1 by a mold machined to produce such a feature in a die casting process. The through-hole 168a-2 is configured to accept the electrical feedthrough 168b. The E-coated portion of the casting 168a-1 is separated from the electrical feedthrough 168b by an E-coat-free zone 168a-5. The solder channel 168a-3 is configured to receive solder, for example, a solder pre-form 410 (see FIGS. 4A and 4B), for forming a solder joint 168c between the electrical feedthrough 168b and the disk-enclosure base 168a.

Although embodiments of the present invention have been presented, by way of example without limitation thereto, for a solder channel 168a-3 and an E-coat-free zone 168a-5 disposed on the interior surface of the casting 168a-1, embodiments of the present invention may also be applied to the exterior surface (not shown) of the casting 168a-1. For example, even if an E-coat layer is not applied to the exterior surface of the casting 168a-1, other types of coating layers on the exterior surface of the casting 168a-1 may also present the opportunity for the formation of adherent solder-flux residue when a solder joint is formed on the exterior surface of the casting 168a-1. Therefore, the inventors also envision embodiments of the present invention in which a coating-free zone, similar to the E-coat-free zone 168a-5, may be provided on the exterior surface of the casting 168a-1 such that a coated portion of the casting on the exterior surface of the casting 168a-1 is separated from the electrical feedthrough 168b by such a coating-free zone that inhibits the formation of adherent solder-flux residue on the exterior surface of the casting 168a-1 in similar fashion to the manner in which the E-coat-free zone 168a-5 inhibits the formation of adherent solder-flux residue on the interior surface of the casting 168a-1. Moreover, such embodiments of the present invention do not preclude the coating-free zone from being an E-coat-free zone on the exterior surface of the casting 168a-1, if the coating layer on the exterior surface of the casting 168a-1 is also an E-coat layer.

With further reference to FIGS. 1 and 2A, in accordance with embodiments of the present invention, the E-coated portion of the casting 168a-1 is separated from the electrical feedthrough 168b by the E-coat-free zone 168a-5. The inventors have found that, in the absence embodiments of the present invention, solder flux that can react with the E-coat layer 168a-4 to form an adherent solder-flux residue, which is difficult to remove. Thus, in accordance with embodiments of the present invention, the E-coat-free zone 168a-5 provides a portion of the surface of the interior wall of the disk enclosure where solder flux can splatter without reacting with the E-coat layer 168a-4 during a soldering operation to join the electrical feedthrough 168b with disk-enclosure base 168a. Subsequently, any solder-flux residue that has splattered onto the E-coat-free zone 168a-5 can be easily removed in a rinsing operation that uses a rinsing agent that includes water. Thus, in accordance with embodiments of the present invention, manufacturing costs of HDD 101 can be reduced, the manufacturing yields of HDDs constructed as HDD 101 are increased, and the reliability of HDD 101 can be increased, above the respective manufacturing costs of an HDD, manufacturing yields of HDDs, and reliability of an HDD without the E-coat-free zone 168a-5, because the formation of adventitious sources of contamination, viz., adherent solder-flux residue, within the disk enclosure has been mitigated, if not entirely avoided. Moreover, in accordance with embodiments of the present invention, as any adherent solder-flux residue that would otherwise remain within the disk enclosure would cause corrosion of HDD components within the disk enclosure, a source of deleterious particulate debris that results from the formation of corrosion products inside an HDD can be reduced, if not entirely eliminated. Thus, in accordance with embodiments of the present invention, soft-error and hard-error rates can be reduced during the operating lifetime of HDD 101, because deleterious particulate debris that can interfere with the fly-height of the magnetic-recording head 110a-2 that affect reading of data from, and writing of data to, the magnetic-recording disk 120 has been reduced, if not entirely eliminated. In accordance with embodiments of the present invention, a portion, enclosed by circle 2B, of the surface of the interior wall of the disk enclosure that includes the E-coat-free zone 168a-5 is next described in greater detail.

Figure 2B:
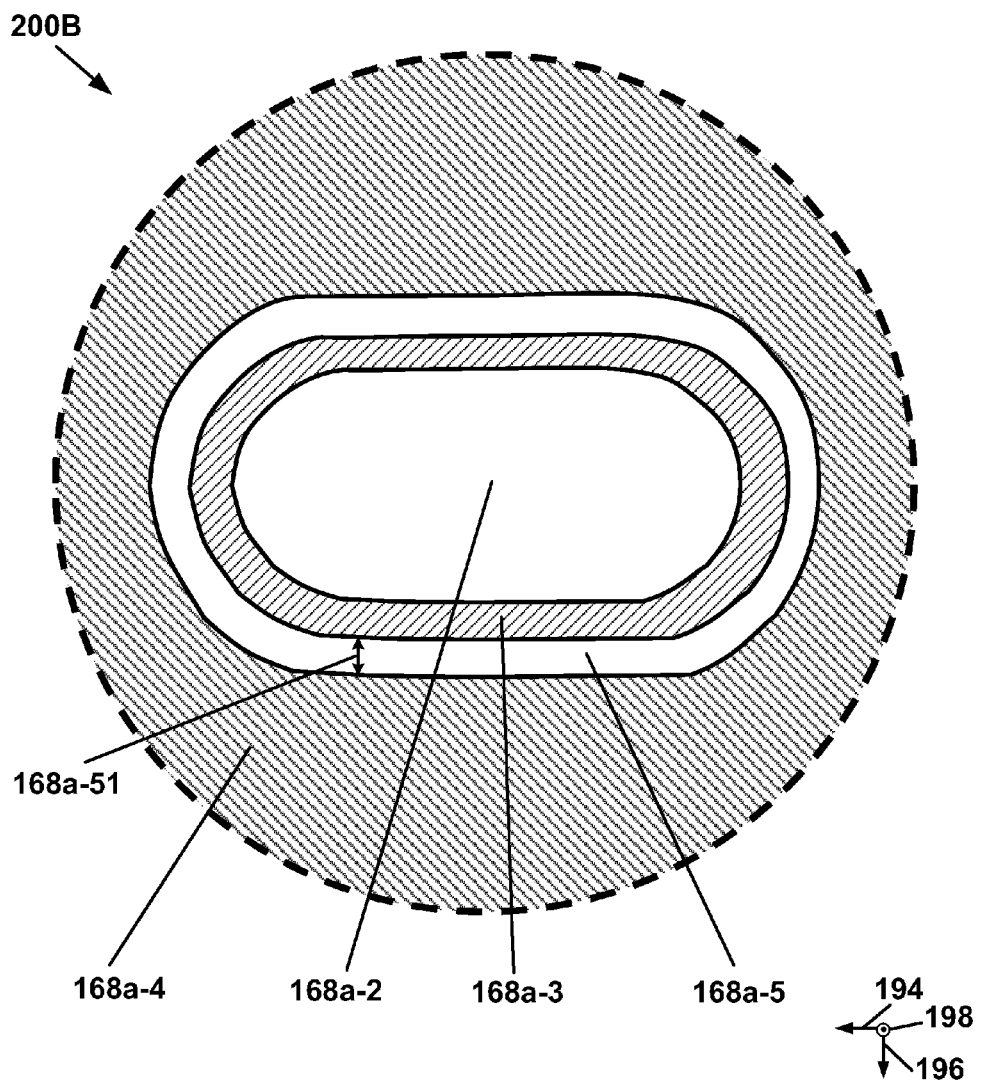
FIG. 2B is an enlarged plan view of components of the disk-enclosure base enclosed by circle 2B of FIG. 2A, which are configured to inhibit formation of adherent solder-flux residue, in accordance with one or more embodiments of the present invention.

With reference now to FIG. 2B and further reference to FIGS. 1 and 2A, in accordance with embodiments of the present invention, a plan view 200B of components of the disk-enclosure base 168a enclosed by circle 2B of FIG. 2A is shown. The E-coat-free zone 168a-5 provides an exposed metal surface where there is no E-coat layer 168a-4 in the area around the solder channel 168a-3 where the solder joint 168c is subsequently formed in the soldering operation. The E-coat-free zone 168a-5 has a width 168a-51 configured to inhibit splattered solder-flux, which results from the soldering operation of the electrical feedthrough 168b to the disk-enclosure base 168a, from reacting with the E-coat layer 168a-4. In accordance with embodiments of the present invention, the width 168a-51 of the E-coat-free zone 168a-5 may be greater than between about 0.25 mm to 1.00 mm, which has been found by the inventors to be suitable for preventing the formation of adherent solid solder-flux residue. The E-coat-free zone 168a-5 includes a region surrounding the through-hole 168a-2 on the interior surface of the casting 168a-1. The E-coated portion of the casting 168a-1 is configured to be separated from the electrical feedthrough 168b by the E-coat-free zone 168a-5. The through-hole 168a-2 is configured to accept the electrical feedthrough 168b in fabricating the disk-enclosure-base/electrical-feedthrough assembly 168, which is next described in greater detail.

Figure 3A:
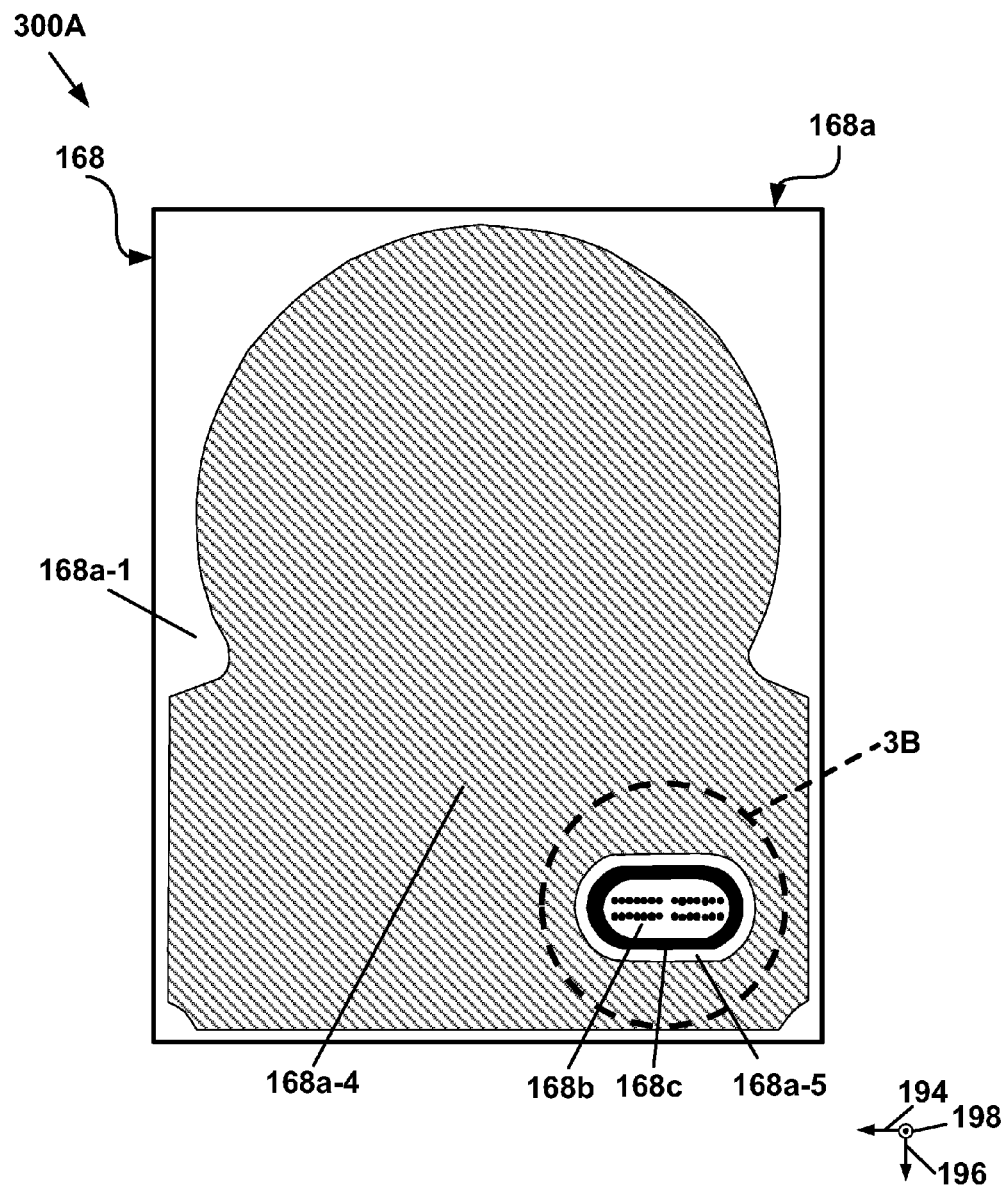
FIG. 3A is a plan view of a disk-enclosure-base/electrical-feedthrough assembly that is configured to inhibit formation of adherent solder-flux residue of the HDD of FIG. 1, detailing the arrangement of components of the disk-enclosure-base/electrical-feedthrough assembly, in accordance with one or more embodiments of the present invention.

With reference now to FIG. 3A, in accordance with embodiments of the present invention, a plan view 300A of the disk-enclosure-base/electrical-feedthrough assembly 168 that is configured to inhibit formation of adherent solder-flux residue within HDD 101 of FIG. 1 is shown. The disk-enclosure-base/electrical-feedthrough assembly 168 includes the electrical feedthrough 168b, the solder joint 168c, and the disk-enclosure base 168a. The disk-enclosure base 168a includes a casting 168a-1, a through-hole 168a-2 in which the electrical feedthrough 168b is disposed, an E-coat layer 168a-4, and an E-coat-free zone 168a-5. The E-coat layer 168a-4 is applied to a first portion of an interior surface of the casting 168a-1. The E-coat-free zone 168a-5 surrounds the solder joint 168c, and includes a second portion of the interior surface of the casting 168a-1 lying between the solder joint 168c and the E-coated first portion of the interior surface of the casting 168a-1. The solder joint 168c also joins the electrical feedthrough 168b to the disk-enclosure base 168a, and is configured to seal hermetically the electrical feedthrough 168b to the disk-enclosure base 168a. The E-coat-free zone 168a-5 is configured to inhibit formation of adherent solder-flux residue. In accordance with embodiments of the present invention, a portion, enclosed by circle 3B, of the surface of the interior wall of the disk enclosure that includes the electrical feedthrough 168b and the solder joint 168c is next described in greater detail.

Figure 3B:
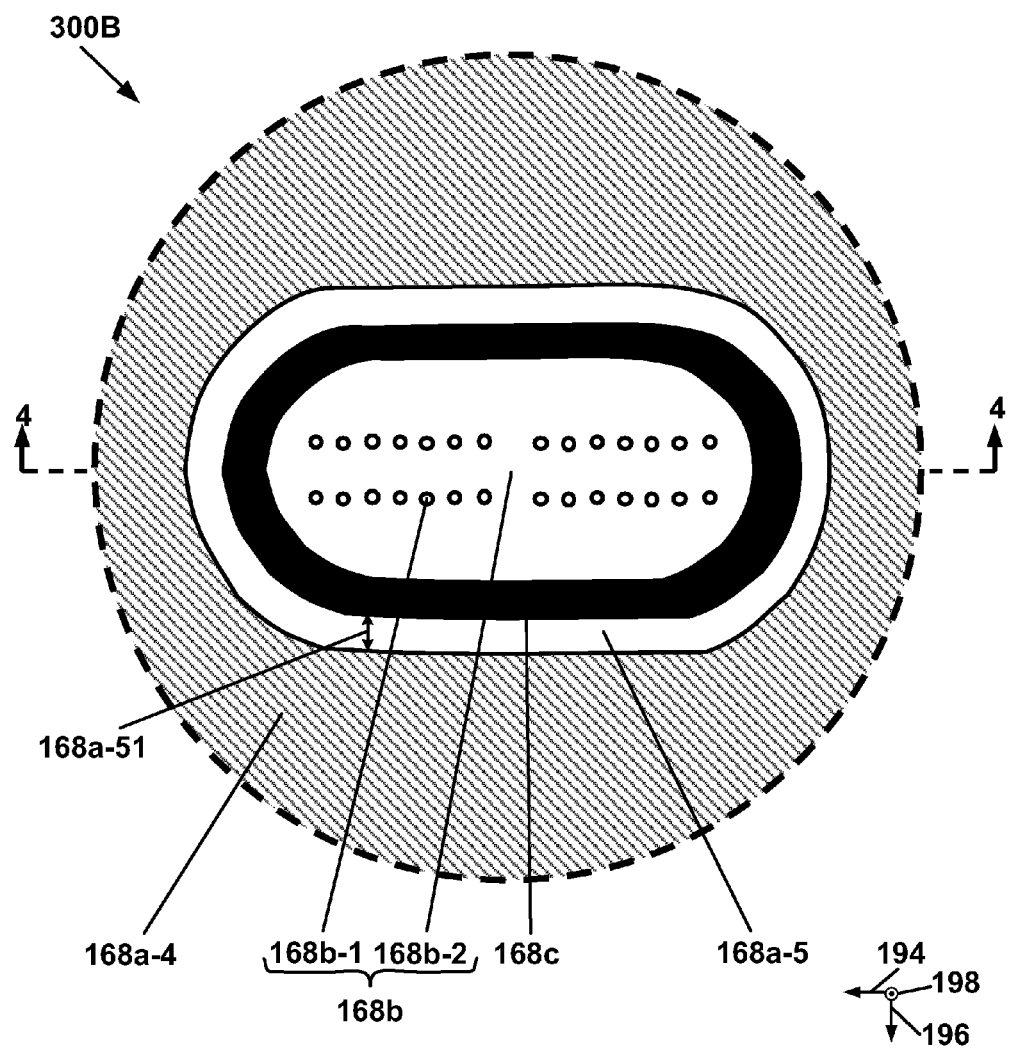
FIG. 3B is an enlarged plan view of components of the disk-enclosure-base/electrical-feedthrough assembly enclosed by circle 3B of FIG. 3A, which are configured to inhibit formation of adherent solder-flux residue, in accordance with one or more embodiments of the present invention.

With reference now to FIG. 3B, in accordance with embodiments of the present invention, a plan view 300B of the components of the disk-enclosure-base/electrical-feedthrough assembly 168 enclosed by circle 3B of FIG. 3A are shown. In accordance with embodiments of the present invention, the components of the disk-enclosure-base/electrical-feedthrough assembly 168 are configured to inhibit formation of adherent solder-flux residue. As shown in FIG. 3B, the electrical feedthrough 168b includes at least one conductor 168b-1 and a body portion 168b-2. Although the term of art, "electrical feedthrough," may be used to refer to a single conductor, as used herein, electrical feedthrough 168b is used to refer to one or more conductors disposed in a body portion for providing electrical communication between the interior space of HDD 101 and the exterior of HDD 101. Between the conductor 168b-1 and the body portion 168b-2 an insulator (not shown) is provided around the conductor 168b-1 isolated electrically from the body portion 168b-2, which may be composed of metallic material. Alternatively, the body portion 168b-2 may be composed of an insulating ceramic material. In accordance with embodiments of the present invention, electrical feedthrough 168b is joined to disk-enclosure base 168a by the solder joint 168c in a soldering operation. Subsequently, any solder flux residue left after the soldering operation may be removed in a rinsing operation. The E-coat-free zone 168a-5 includes a bare metal surface from which solder-flux residue may be easily removed in the rinsing operation. Thus, in accordance with embodiments of the present invention, the E-coat-free zone 168a-5 is configured to facilitate removal of solder-flux residue with liquid. In accordance with embodiments of the present invention, the liquid may include water. In accordance with embodiments of the present invention, the casting 168a-1 is composed of a metal selected from the group consisting of aluminum, an aluminum alloy, nickel, and a nickel alloy. The solder used in the soldering operation of the electrical feedthrough 168b to the disk-enclosure base 168a and the metal are selected so that the solder wets the metal. A surface energy between solder used in a soldering operation of the electrical feedthrough 168b to the disk-enclosure base 168a and the metal is low. In accordance with embodiments of the present invention, a portion, along line 4-4, of the surface of the interior wall of the disk enclosure that includes the electrical feedthrough 168b and the solder joint 168c is next described in still greater detail.

Figure 4A:
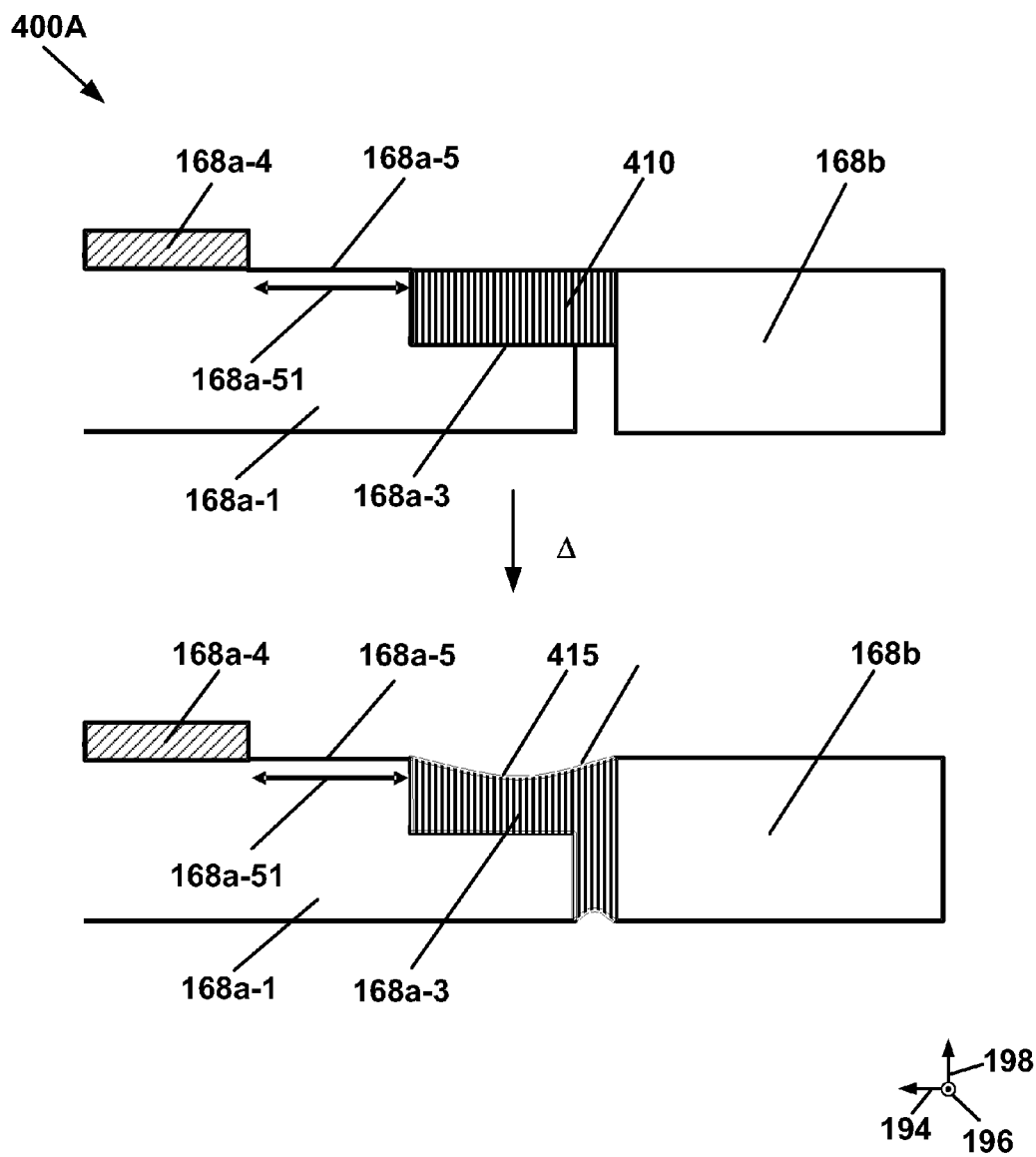
FIG. 4A is a cross-sectional elevation view, along line 4-4 of FIG. 3B, of an example arrangement of components at a location of a solder joint of the disk-enclosure-base/electrical-feedthrough assembly both before (upper part of FIG. 4A) and after (lower part of FIG. 4A) a soldering operation that fabricates the solder joint joining an electrical feedthrough to the disk-enclosure base, in accordance with one or more embodiments of the present invention.
Figure 4B:
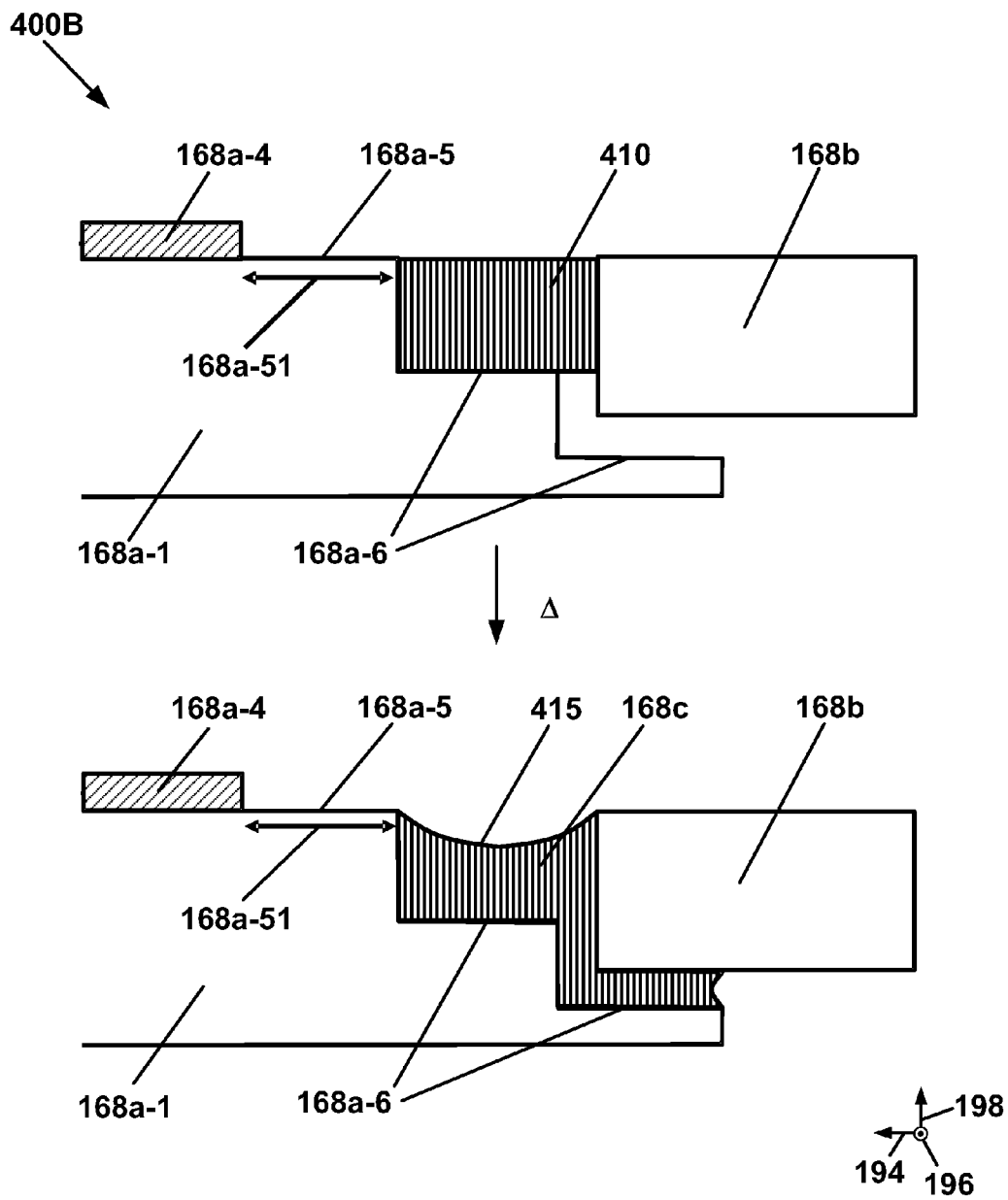
FIG. 4B is cross-sectional elevation view, along line 4-4 of FIG. 3B, of an alternative example arrangement of components at a location of a solder joint of the disk-enclosure-base/electrical-feedthrough assembly both before (upper part of FIG. 4B) and after (lower part of FIG. 4B) a soldering operation that fabricates the solder joint joining the electrical feedthrough to the disk-enclosure base, in accordance with one or more alternative embodiments of the present invention.

With reference now to FIGS. 4A and 4B, in accordance with embodiments of the present invention, a cross-sectional elevation view 400A, along line 4-4 of FIG. 3B, of an example arrangement of components at a location of the solder joint 168c of the disk-enclosure-base/electrical-feedthrough assembly 168 is shown. FIGS. 4A and 4B detail the location of the solder joint 168c of the disk-enclosure-base/electrical-feedthrough assembly 168 both before (upper parts of FIGS. 4A and 4B) and after (lower parts of FIGS. 4A and 4B) a soldering operation that fabricates the solder joint 168c that joins the electrical feedthrough 168b to the disk-enclosure base 168a. As shown in the upper parts of FIGS. 4A and 4B, in the soldering operation, the electrical feedthrough 168b is disposed at the location of the through-hole 168a-2 shown in FIGS. 2A and 2B. The electrical feedthrough 168b is aligned with the casting 168a-1 and solder, for example, the solder preform 410, is placed in the solder channel 168a-3. The solder, for example, the solder preform 410, is separated from the E-coat layer 168a-4 by the E-coat-free zone 168a-5. Heat may then be applied to flow the solder to form the solder joint 168c, which is indicated by the arrow labeled Δ, which is the chemical symbol for the application of heat. The heat may be applied locally to the solder with a laser, by way of example without limitation thereto. The width 168a-51 of the E-coat-free zone 168a-5 prevents splattered solder flux used in the soldering operation from reaching the E-coat layer 168a-4, where the splattered solder flux might form an adherent solid solder-flux residue by reacting with the E-coat layer 168a-4. In accordance with embodiments of the present invention, the casting 168a-1 is composed of a metal selected from the group consisting of aluminum, an aluminum alloy, nickel, and a nickel alloy. A wetting characteristic of a solder of the solder joint 168*c* to the metal is selected to produce a concave outer surface 415 of the solder joint 168*c*. The wetting characteristic of the solder of the solder joint 168*c* to the metal is selected to prevent formation of a crack in the solder joint 168*c*. Thus, the solder joint 168*c* between the electrical feedthrough 168*b* and the disk-enclosure base 168*a* may include a butt joint, as shown in FIG. 4A, by way of example without limitation thereto, as other joint arrangements are also within the spirit and scope of embodiments of the present invention, as next described.

With reference now to FIG. 4B, in accordance with embodiments of the present invention, a cross-sectional elevation view 400B, along line 4-4 of FIG. 3B, of an alternative example arrangement of components at the location of the solder joint 168*c* of the disk-enclosure-base/electrical-feedthrough assembly 168 is shown. In contrast with FIG. 4A, during the soldering operation, the solder, for example, the solder preform 410, may alternatively be placed in a solder channel 168*a*-3 that includes a tiered flange-structure 168*a*-6. Thus, in accordance with embodiments of the present invention, the solder joint 168*c* between the electrical feedthrough 168*b* and the disk-enclosure base 168*a* may include a lap joint, as shown in FIG. 4B, where a portion of the lower surface of the electrical feedthrough 168*b* overlaps a lower flange of the casting 168*a*-1 in the tiered flange-structure 168*a*-6. Thus, in an alternative embodiment of the present invention, the casting may further include the tiered flange-structure 168*a*-6 adjacent to and surrounding the through-hole 168*a*-2, which is configured to form the lap joint. The E-coat-free zone 168*a*-5 includes a region adjacent to and surrounding the tiered flange-structure 168*a*-6 on the interior surface of the casting 168*a*-1.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk-enclosure base that is configured to inhibit formation of adherent solder-flux residue, said disk-enclosure base comprising:
    a casting;
    a through-hole fabricated in said casting configured to accept an electrical feedthrough;
    a solder channel adjacent to and surrounding said through-hole;
    an E-coat layer applied to a first portion of an interior surface of said casting; and
    an E-coat-free zone adjacent to and surrounding said solder channel, and comprising a second portion of said interior surface of said casting lying between said solder channel and said E-coated first portion of said interior surface of said casting;
    wherein said E-coat-free zone is configured to inhibit formation of adherent solder-flux residue.

2. The disk-enclosure base of claim 1, wherein said E-coat-free zone has a width configured to inhibit splattered solder-flux, resulting from a soldering operation of said electrical feedthrough to said disk-enclosure base, from reacting with said E-coat layer.

3. The disk-enclosure base of claim 1 said casting further comprising:
    a tiered flange-structure adjacent to and surrounding said through-hole.

4. The disk-enclosure base of claim 3, wherein said E-coat-free zone comprises a region adjacent to and surrounding said tiered flange-structure on said interior surface of said casting.

5. The disk-enclosure base of claim 4, wherein said E-coat-free zone has a width configured to inhibit splattered solder-flux, resulting from a soldering operation of said electrical feedthrough to said disk-enclosure base, from reacting with said E-coat layer.

6. The disk-enclosure base of claim 1, wherein said casting is composed of a metal selected from the group consisting of aluminum, an aluminum alloy, nickel, and a nickel alloy.

7. A disk-enclosure-base/electrical-feedthrough assembly that is configured to inhibit formation of adherent solder-flux residue, said disk-enclosure-base/electrical-feedthrough assembly comprising:
    an electrical feedthrough;
    a solder joint; and
    a disk-enclosure base comprising:
        a casting;
        a through-hole in which said electrical feedthrough is disposed;
        an E-coat layer applied to a first portion of an interior surface of said casting; and
        an E-coat-free zone surrounding said solder joint, and comprising a second portion of said interior surface of said casting lying between said solder joint and said E-coated first portion of said interior surface of said casting; and
    wherein said solder joint joins said electrical feedthrough to said disk-enclosure base, and is configured to seal hermetically said electrical feedthrough to said disk-enclosure base;
    wherein said E-coat-free zone is configured to inhibit formation of adherent solder-flux residue.

8. The disk-enclosure-base/electrical-feedthrough assembly of claim 7, wherein said solder joint between said electrical feedthrough and said disk-enclosure base comprises a lap joint.

9. The disk-enclosure-base/electrical-feedthrough assembly of claim 7, wherein said solder joint between said electrical feedthrough and said disk-enclosure base comprises a butt joint.

10. The disk-enclosure-base/electrical-feedthrough assembly of claim 7, wherein said casting is composed of a metal selected from the group consisting of aluminum, an aluminum alloy, nickel, and a nickel alloy.

11. The disk-enclosure-base/electrical-feedthrough assembly of claim 10, wherein a wetting characteristic of a solder of said solder joint to said metal is selected to produce a concave outer surface of said solder joint.

12. The disk-enclosure-base/electrical-feedthrough assembly of claim 10, wherein a wetting characteristic of a solder of said solder joint to said metal is selected to prevent formation of a crack in said solder joint.

13. The disk-enclosure-base/electrical-feedthrough assembly of claim 7, wherein said E-coat-free zone is configured to facilitate removal of solder-flux residue with liquid.

14. The disk-enclosure-base/electrical-feedthrough assembly of claim 13, wherein said liquid comprises water.

15. A hard-disk drive (HDD) with a disk-enclosure-base/electrical-feedthrough assembly that is configured to inhibit formation of adherent solder-flux residue, said HDD comprising:
- a magnetic-recording disk;
- a disk enclosure comprising a disk-enclosure cover, and a disk-enclosure-base/electrical-feedthrough assembly, said disk-enclosure-base/electrical-feedthrough assembly comprising:
  - an electrical feedthrough;
  - a solder joint; and
  - a disk-enclosure base comprising:
    - a casting;
    - a through-hole in which said electrical feedthrough is disposed;
    - an E-coat layer applied to a first portion of an interior surface of said casting; and
    - an E-coat-free zone surrounding said solder joint, and comprising a second portion of said interior surface of said casting lying between said solder joint and said E-coated first portion of said interior surface of said casting; and
  - wherein said solder joint joins said electrical feedthrough to said disk-enclosure base, and is configured to seal hermetically said electrical feedthrough to said disk-enclosure base;
- wherein said E-coat-free zone is configured to inhibit formation of adherent solder-flux residue;
- a spindle motor affixed in said disk-enclosure-base/electrical-feedthrough assembly, for rotating said magnetic-recording disk; and
- a magnetic-recording head comprising:
  - a write element configured to write data to said magnetic-recording disk;
  - a read element configured to read data from said magnetic-recording disk.

16. The HDD of claim 15, further comprising a low-density gas;
  wherein said low-density gas fills an interior space of said HDD formed by said disk enclosure.

17. The HDD of claim 16, wherein said low-density gas comprises helium.

18. The HDD of claim 16, wherein said solder joint between said electrical feedthrough and said disk-enclosure base is configured to be impervious to leakage of said low-density gas out from said interior space of said HDD through said solder joint.

19. The HDD of claim 16, wherein said solder joint is substantially free of cracks that could result in leakage of said low-density gas out from said interior space of said HDD through said solder joint.

20. The HDD of claim 15, wherein said disk-enclosure-base/electrical-feedthrough assembly is substantially free of corrosive solder-flux residue.

* * * * *